(12) United States Patent
Mei et al.

(10) Patent No.: US 12,471,968 B2
(45) Date of Patent: Nov. 18, 2025

(54) MEMORY ALLOY PERIOSTEAL TRACTION PLATE

(71) Applicant: Haibo Mei, Hunan (CN)

(72) Inventors: Haibo Mei, Changsha (CN); Xiongke Hu, Changsha (CN)

(73) Assignee: Haibo Mei, Changsha (CN)

( * ) Notice: Subject to any disclaimer, the term of this patent is extended or adjusted under 35 U.S.C. 154(b) by 0 days.

(21) Appl. No.: 18/736,401

(22) Filed: Jun. 6, 2024

(65) Prior Publication Data

US 2025/0040971 A1 Feb. 6, 2025

(30) Foreign Application Priority Data

Aug. 2, 2023 (CN) .......................... 202310960226.5

(51) Int. Cl.
*A61B 17/80* (2006.01)
*A61B 17/00* (2006.01)

(52) U.S. Cl.
CPC ...... *A61B 17/8004* (2013.01); *A61B 17/8061* (2013.01); *A61B 17/8085* (2013.01); *A61B 2017/00867* (2013.01)

(58) Field of Classification Search
CPC ...... A61B 17/7059; A61B 2017/00867; A61B 17/80; A61B 17/8004; A61B 17/8061; A61B 17/8085
See application file for complete search history.

(56) References Cited

U.S. PATENT DOCUMENTS 9,439,696 B2 * 9/2016 Pierce .................... A61B 17/56

* cited by examiner

*Primary Examiner* — Larry E Waggle, Jr.
(74) *Attorney, Agent, or Firm* — Bochner PLLC; Andrew D. Bochner

(57) ABSTRACT

A memory alloy periosteal traction plate is provided, including a plate body and screws. A work surface, a proximal installation end, and a distal installation end are formed on the plate body. The work surface fits a surface of a curved long bone, and extends in a length direction of the long bone. The proximal installation end is located at one end, close to a proximal end of the long bone, of the plate body, and the distal installation end is located at one end, close to a distal end of the long bone, of the plate body. Both the proximal installation end and the distal installation end are firmly connected to the long bone through screws by means of multiple fixing points, the plate body can gradually transition from a bending state to a straight state by means of deformation.

20 Claims, 4 Drawing Sheets

MEMORY ALLOY PERIOSTEAL TRACTION PLATE

CROSS-REFERENCE TO RELATED APPLICATION

This patent application claims the benefit and priority of Chinese Patent Application No. 2023109602265 filed with the China National Intellectual Property Administration on Aug. 2, 2023, the disclosure of which is incorporated by reference herein in its entirety as part of the present application.

TECHNICAL FIELD

The present disclosure relates to the technical field of medical devices, and in particular to a memory alloy periosteal traction plate.

BACKGROUND

Long bone curvature refers to the abnormal curvature or bend of human long bones such as femur, tibia, ulna and radius, which is generally caused by skeletal dysplasia or external factors. Under normal conditions, the long bones should be straight to support the body and provide normal movement function. However, curved long bones will cause a series of problems to the human body, such as appearance abnormality, gait abnormality, limited movement, and fracture.

The current treatment for long bone curvature mainly depends on the specific situation of the patient's etiology and degree of curvature. For mild and non-progressive curved long bones, observation and regular monitoring are required. Usually, the non-surgical treatment method is to use correction braces, which are worn to gradually correct or control the curvature of the long bones. However, when using the correction braces, patients is required to follow certain instructions on wearing and adjusting the braces, and the correction effect is poor for situations with severe curvature. For severe, progressive, or other treatment-ineffective curved long bones, surgery is generally used for correction. Surgical correction usually requires resection or bone transplantation, and internal fixation or external fixation devices are used for skeletal fixation. Surgical correction can effectively correct the curved long bones and restore skeletal function thereof. However, conventional surgical methods of osteotomy and fixation have high risks and complications, and the postoperative rehabilitation process generally takes a long time.

SUMMARY

The technical problem to be solved by the present disclosure is to overcome the disadvantages in the prior art, and a memory alloy periosteal traction plate is provided, which is simple in surgical operation, safe and reliable, and capable of effectively supporting a curved long bone, promoting subperiosteal osteogenesis, increasing bone strength and preventing fractures.

To achieve the objective above, the present disclosure provides the following technical solution:

A memory alloy periosteal traction plate, including a plate body, and screws. A work surface, a proximal installation end, and a distal installation end are formed on the plate body. The work surface fits a surface of a curved long bone, and extends in a length direction of the long bone. The proximal installation end is located at one end, close to a proximal end of the long bone, of the plate body, and the distal installation end is located at one end, close to a distal end of the long bone, of the plate body. Both the proximal installation end and the distal installation end are firmly connected to the long bone by screws through a plurality of fixing points. The plate body is capable of gradually transitioning from a bending state to a straight state by means of deformation, so as to promote subperiosteal osteogenesis of the long bone and increase a bone diameter of a curved part of the long bone. The bending state is a state of an installed plate body, and the straight state is a stable state to which the installed plate body gradually restores.

As a further improvement of the technical solution above:

The plate body is arranged on a concave side of the long bone.

The plate body is made of a nickel-titanium alloy material, and is arc-shaped through low-temperature treatment.

The low temperature is in a range of 0~4° C.

A reversible phase transition temperature of the plate body is 35° C.

The work surface is an arc surface.

A width of the plate body in a circumferential direction of the long bone is in a range of 0.8~2 cm.

Multiple prefabricated holes are formed in each of the proximal installation end and the distal installation end, and the screws are connected to the long bone through the prefabricated holes.

The multiple prefabricated holes are formed in a length direction of the long bone.

Two prefabricated holes are formed in each of the proximal installation end and the distal installation end.

Compared with the prior art, the present disclosure achieves beneficial effects as follows:

The plate body provided in the present disclosure is made of memory alloy, which is placed in a periosteal incision with a width of 1~2 cm of the long bone after low-temperature treatment and fits bone cortex, and the proximal installation end and the distal installation end of the plate body are fixed to the long bone by screws, thus the plate body can not only play a role of supporting, reducing the stress of the curved long bone, and preventing the bearing long bone from further bending, but also effectively stimulate subperiosteal osteogenesis to increase the bone diameter of the curved long bone, improve the curvature of the long bone, and increase the bone strength. Therefore, the problems of difficulty in orthopedic and large surgical trauma in diseases such as bending deformity of the long bone are solved, the advantages of small trauma, no need for osteotomy treatment, simple operation, safety, reliability, and easy monitoring are achieved, and the curved long bone can be effectively corrected to restore the skeletal function. The plate body is suitable for cases such as congenital pseudoarthrosis of tibia, osteogenesis imperfecta, epiphyseal dysplasia and the like.

100—long bone, 200—periosteum, 1—plate body, 11—work surface, 12—proximal installation end, 13—distal installation end, 14—prefabricated hole, 2—screw.

DETAILED DESCRIPTION OF THE EMBODIMENTS

The present disclosure is further described below with reference to accompanying drawings and specific embodiments.

Figure 1:
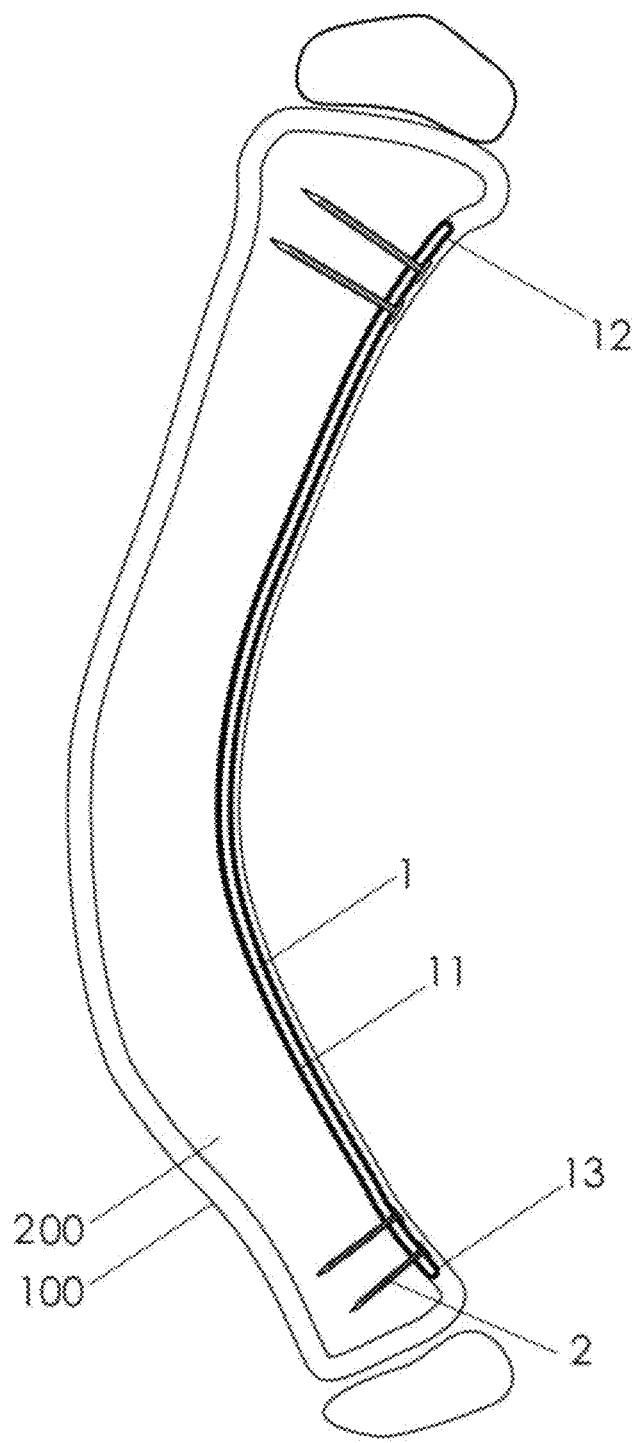
FIG. 1 is a structural schematic diagram of a memory alloy periosteal traction plate in a bending state.
Figure 2:
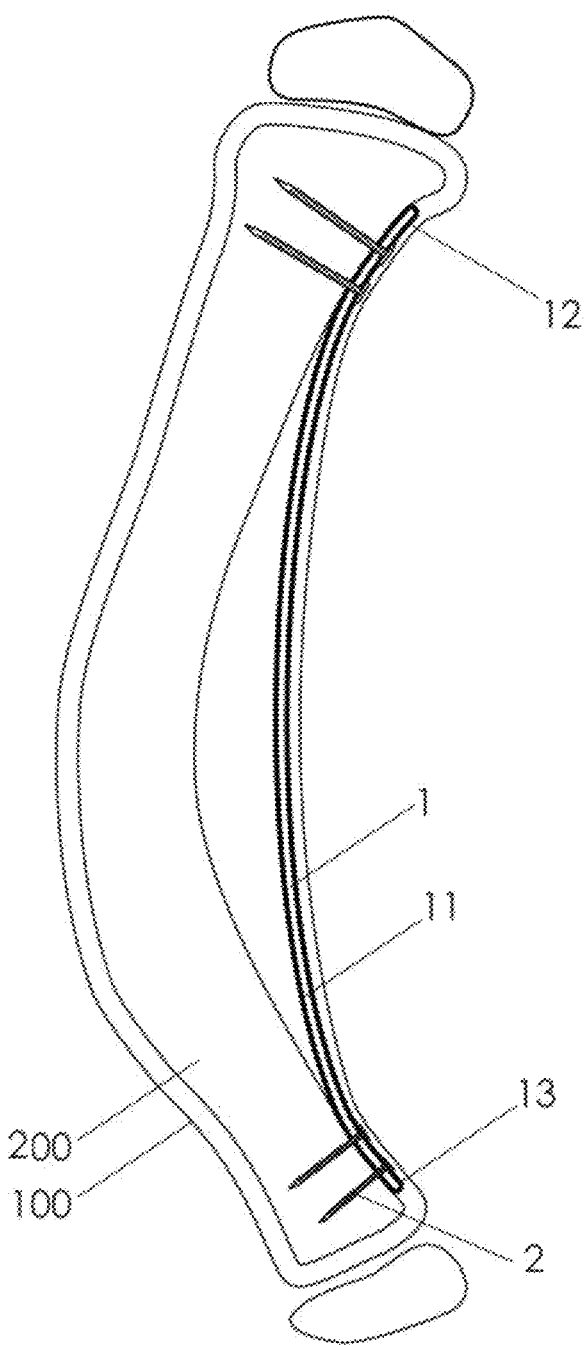
FIG. 2 is a structural schematic diagram of a memory alloy periosteal traction plate in a straight state.
Figure 3:
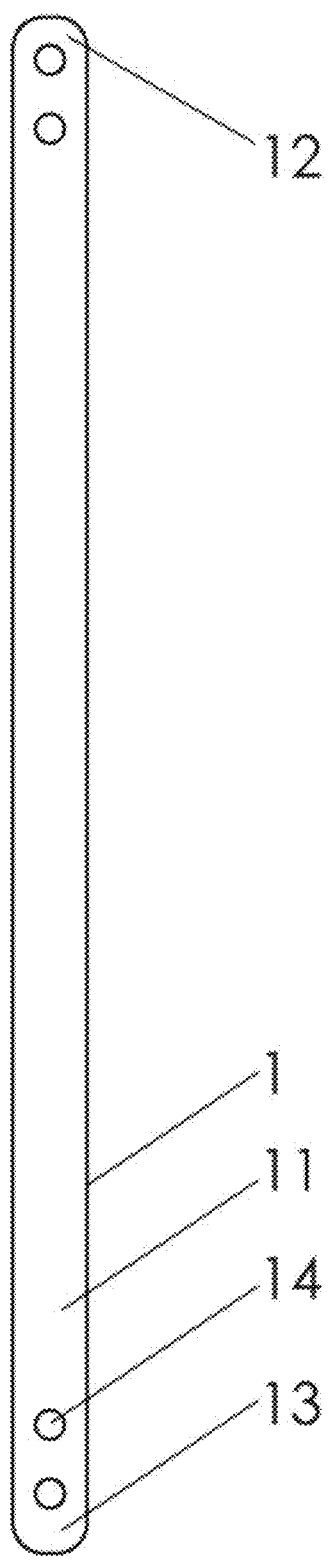
FIG. 3 is a structural schematic diagram of a memory alloy periosteal traction plate.
Figure 4:
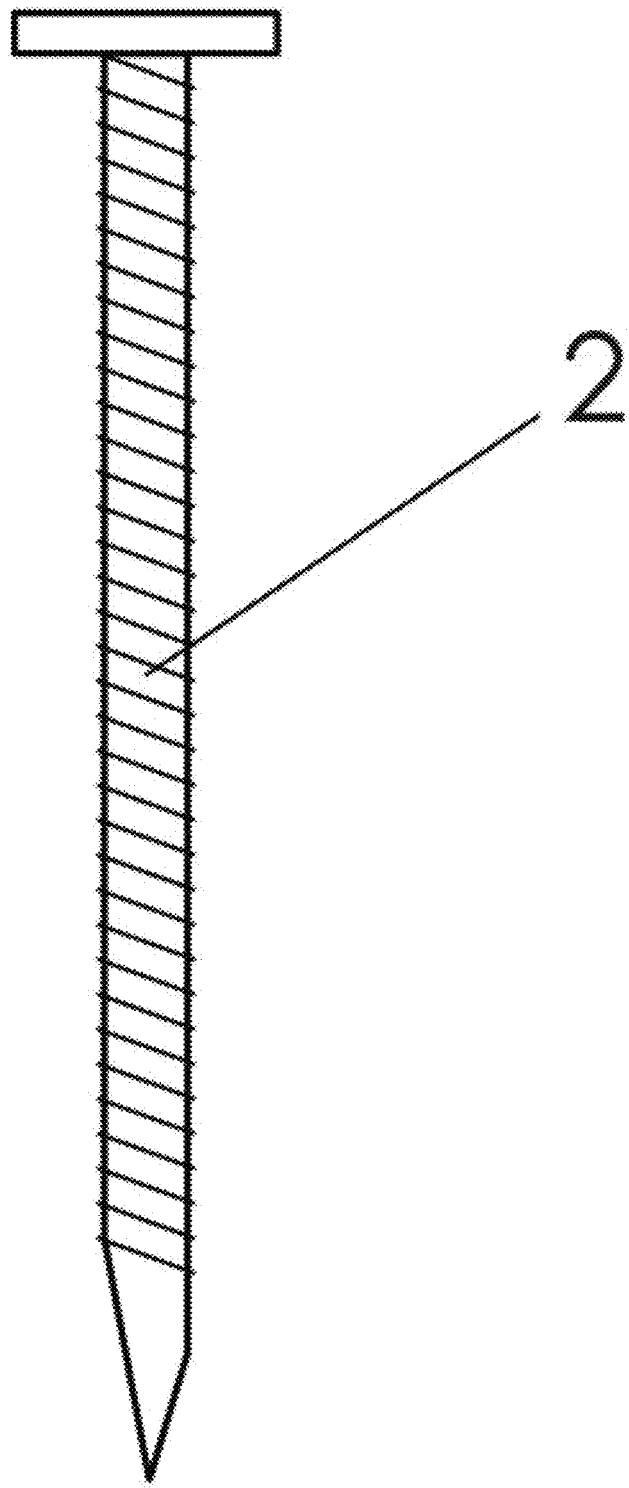
FIG. 4 is a structural schematic diagram of a screw.

As shown in FIG. 1 to FIG. 4, a memory alloy periosteal traction plate provided by this embodiment includes a plate body 1, and screws 2. A work surface 11, a proximal installation end 12, and a distal installation end 13 are formed on the plate body 1. The work surface 11 fits a surface of a curved long bone 100, and extends in a length direction of the long bone 100. The proximal installation end 12 is located at one end, close to a proximal end of the long bone 100, of the plate body 1, and the distal installation end 13 is located at one end, close to a distal end of the long bone 100, of the plate body 1. Both the proximal installation end 12 and the distal installation end 13 are firmly connected to the long bone 100 by screws 2 through multiple fixing points, and the plate body 1 is capable of gradually transitioning from a bending state to a straight state by means of deformation to promote subperiosteal osteogenesis of the long bone 100 and increase a bone diameter of a curved part of the long bone 100. The bending state is a state of an installed plate body 1, and the straight state is a stable state to which the installed plate body 1 restores. The plate body 1 is made of memory alloy, which is placed in a periosteal incision with a width of 1~2 cm of the long bone 100 after low-temperature treatment and fits bone cortex, and then the proximal installation end 12 and the distal installation end 13 of the plate body 1 are fixed to the long bone 100 by screws 2, thus the plate body 1 can not only play a role of supporting, reducing the stress of the curved long bone 100, and preventing the bearing long bone 100 from further bending, but also effectively stimulate subperiosteal osteogenesis to increase the bone diameter of the curved long bone 100, improve the curvature of the long bone 100 and increase the bone strength. Therefore, the problems of difficulty in orthopedic and large surgical trauma in diseases such as bending deformity of the long bone 100 are solved, the advantages of small trauma, no need for osteotomy treatment, simple operation, safety, reliability, and easy monitoring are achieved. The plate body 1 can play a role of supporting the long bone 100, and performing periosteal traction and subperiosteal osteogenesis of the long bone, thus making the long bone restore the skeletal function. The plate body is suitable for cases such as congenital pseudoarthrosis of tibia, osteogenesis imperfecta, epiphyseal dysplasia and the like.

In this embodiment, the plate body 1 is arranged on a concave side of the long bone 100. The plate body 1, when restoring from a bending state to a straight state, can produce a supporting force for the long bone 100, which can effectively bear and protect the long bone 100.

In this embodiment, the plate body 1 is made of a nickel-titanium alloy material and is arc-shaped through low-temperature treatment. The nickel-titanium alloy material is shape memory alloy, which is special alloy which can automatically restore its own plastic deformation to its original shape at a certain temperature, and has good plasticity.

In this embodiment, the low temperature is in a range of 0~4° C. In this temperature range, the plate body 1 can be processed to fit the concave side of the curved long bone 100.

In this embodiment, a reversible phase transition temperature of the plate body is 35° C. When the temperature exceeds 35° C., the plate body 1 will restore to the stable straight state when being warmed to the body temperature of the human body.

In this embodiment, the work surface is an arc surface. The arc-shaped work surface 11 can fit the surface of the long bone 100 over a large range.

In this embodiment, a width of the plate body 1 in a circumferential direction of the long bone 100 is in a range of 0.8~2 cm.

In this embodiment, multiple prefabricated holes 14 are formed in each of the proximal installation end 12 and the distal installation end 13, and the screws 2 are connected to the long bone 100 through the prefabricated holes 14. Plate bodies 1 with various lengths can be made, and when in use, the plate body 1 with a matched length can be selected according to length data measured on the long bone 100 before operation, so as to ensure that the traction plate can play the most orthopedic role.

In this embodiment, the multiple prefabricated holes 14 are formed in the length direction of the long bone 100.

In this embodiment, two prefabricated holes 14 are formed in each of the proximal installation end 12 and the distal installation end 12. The prefabricated holes 14 close to both ends are 1~2 cm away from ends of the plate body 1, and a spacing between two adjacent prefabricated holes 14 is in a range of 1~2 cm.

The above is only the preferred embodiment of the present disclosure, and the scope of protection of the present disclosure is not limited to the above embodiments. For those of ordinary skill in the art, various improvements and changes made without departing from the technical concept of the present disclosure shall be regarded as the scope of protection of the present disclosure.

What is claimed is:

1. A memory alloy periosteal traction plate, comprising a plate body (1), and screws (2), wherein a work surface (11), a proximal installation end (12), and a distal installation end (13) are formed on the plate body (1), and the work surface fits a surface of a curved long bone (100), and extends in a length direction of the long bone (100); the proximal installation end (12) is located at one end, close to a proximal end of the long bone (100), of the plate body (1), and the distal installation end (13) is located at one end, close to a distal end of the long bone (100), of the plate body (1); both the proximal installation end (12) and the distal installation end (13) are configured to be firmly connected to the long bone (100) through screws (2) by means of a plurality of fixing points, the plate body (1) is capable of gradually transitioning from a bending state to a straight state by means of deformation, so as to promote subperiosteal osteogenesis of the long bone (100) and increase a bone diameter of a curved part of the long bone (100); and the bending state is a state of an installed plate body (1), and the straight state is a stable state to which the installed plate body gradually restores.

2. The memory alloy periosteal traction plate according to claim 1, wherein the plate body (1) is configured to be arranged on a concave side of the long bone (100).

3. The memory alloy periosteal traction plate according to claim 2, wherein a plurality of prefabricated holes (14) are formed in each of the proximal installation end (12) and the distal installation end (13), and the screws (2) are configured to be connected to the long bone (100) through the prefabricated holes (14).

4. The memory alloy periosteal traction plate according to claim 3, wherein the plurality of prefabricated holes (14) are formed in a length direction of the long bone (100).

5. The memory alloy periosteal traction plate according to claim 1, wherein the plate body (1) is made of a nickel-titanium alloy material, and is arc-shaped through low-temperature treatment.

6. The memory alloy periosteal traction plate according to claim 5, wherein the low temperature is in a range of 0~4° C.

7. The memory alloy periosteal traction plate according to claim 6, wherein a reversible phase transition temperature of the plate body (1) is 35° C.

8. The memory alloy periosteal traction plate according to claim 7, wherein a plurality of prefabricated holes (14) are formed in each of the proximal installation end (12) and the distal installation end (13), and the screws (2) are configured to be connected to the long bone (100) through the prefabricated holes (14).

9. The memory alloy periosteal traction plate according to claim 8, wherein the plurality of prefabricated holes (14) are formed in a length direction of the long bone (100).

10. The memory alloy periosteal traction plate according to claim 6, wherein a plurality of prefabricated holes (14) are formed in each of the proximal installation end (12) and the distal installation end (13), and the screws (2) are configured to be connected to the long bone (100) through the prefabricated holes (14).

11. The memory alloy periosteal traction plate according to claim 10, wherein the plurality of prefabricated holes (14) are formed in a length direction of the long bone (100).

12. The memory alloy periosteal traction plate according to claim 5, wherein a plurality of prefabricated holes (14) are formed in each of the proximal installation end (12) and the distal installation end (13), and the screws (2) are configured to be connected to the long bone (100) through the prefabricated holes (14).

13. The memory alloy periosteal traction plate according to claim 12, wherein the plurality of prefabricated holes (14) are formed in a length direction of the long bone (100).

14. The memory alloy periosteal traction plate according to claim 1, wherein the work surface (11) is an arc surface.

15. The memory alloy periosteal traction plate according to claim 14, wherein a plurality of prefabricated holes (14) are formed in each of the proximal installation end (12) and the distal installation end (13), and the screws (2) are configured to be connected to the long bone (100) through the prefabricated holes (14).

16. The memory alloy periosteal traction plate according to claim 1, wherein a width of the plate body (1) in a circumferential direction of the long bone (100) is in a range of 0.8~2 cm.

17. The memory alloy periosteal traction plate according to claim 16, wherein a plurality of prefabricated holes (14) are formed in each of the proximal installation end (12) and the distal installation end (13), and the screws (2) are configured to be connected to the long bone (100) through the prefabricated holes (14).

18. The memory alloy periosteal traction plate according to claim 1, wherein a plurality of prefabricated holes (14) are formed in each of the proximal installation end (12) and the distal installation end (13), and the screws (2) are configured to be connected to the long bone (100) through the prefabricated holes (14).

19. The memory alloy periosteal traction plate according to claim 18, wherein the plurality of prefabricated holes (14) are formed in a length direction of the long bone (100).

20. The memory alloy periosteal traction plate according to claim 18, wherein two prefabricated holes (14) are formed in each of the proximal installation end (12) and the distal installation end (13).

\* \* \* \* \*